United States Patent [19]

Nigrin

[11] Patent Number: 4,748,137
[45] Date of Patent: May 31, 1988

[54] LOW TEMPERATURE MELTING FRITS
[75] Inventor: Jaroslava M. Nigrin, Corning, N.Y.
[73] Assignee: Corning Glass Works, Corning, N.Y.
[21] Appl. No.: 51,840
[22] Filed: May 20, 1987
[51] Int. Cl.$^4$ .......................... C03C 3/21; C03C 8/08; C03C 8/04; C03C 3/19
[52] U.S. Cl. ........................................ 501/46; 501/24; 501/26; 501/47
[58] Field of Search .................. 501/24, 26, 45, 46, 501/47

[56] References Cited
U.S. PATENT DOCUMENTS

| | | | |
|---|---|---|---|
| 3,258,434 | 6/1966 | Mackenzie et al. | 501/49 |
| 3,446,695 | 5/1969 | Janakirama-Rao | 501/26 |
| 3,650,778 | 3/1972 | Dumeswil et al. | 501/46 |
| 4,544,974 | 10/1985 | West, Jr. et al. | 501/47 |

Primary Examiner—Mark L. Bell
Attorney, Agent, or Firm—Clinton S. Janes, Jr.

[57] ABSTRACT

This invention is directed to the production of essentially lead-free glass compositions demonstrating softening points below 500° C. and coefficients of thermal expansion somewhat below $88 \times 10^{-7}$/°C. The glasses consist essentially, in weight percent on the oxide basis, of

| | | | |
|---|---|---|---|
| $Li_2O$ | 1–4 | $Na_2O + K_2O$ | 0–12 |
| ZnO | 20–30 | CaO | 0–7 |
| $B_2O_3$ | 32–42 | SrO | 0–10 |
| $Al_2O_3$ | 2–5 | BaO | 0–15 |
| $ZrO_2$ | 2–6 | CaO + SrO + BaO | 0–15 |
| $P_2O_5$ | 6–10 | $V_2O_5$ | 0–22 |
| $Na_2O$ | 0–8 | $Bi_2O_3$ | 0–16 |
| $K_2O$ | 0–8.40 | $V_2O_5 + Bi_2O_3$ | 5–25 | wherein a minimum of 5% $V_2O_5 + Bi_2O_3$ is required in the presence of a least 2% $Na_2O$ or 5% $K_2O$, and a minimum of 9% $V_2O_5 + Bi_2O_3$ is required in the essential absence of $Na_2O$ or $K_2O$, but in the presence of at least 3% CaO or 6% SrO or 9% BaO.

3 Claims, No Drawings

LOW TEMPERATURE MELTING FRITS

The frangible domes enveloping the radomes utilized in various heat seeking missiles are covered with a protective coating which prevents the missiles from locking into stray signals in the infrared region of the radiation spectrum. An extensive discussion and review of the technology relating to such frangible domes is presented in *The Application of Frangible Glasses and Glass-Ceramics as Missile Domes*, H. A. Miska, Electromagnetic Windows Conference, Georgia Technology University, June 1982. The domes are currently fashioned from Corning Code 0313, a chemically strengthened, alkali metal aluminosilicate glass marketed by Corning Glass Works, Corning, N.Y., and are covered with Matte Black Glaze #24-1255 marketed by Drakenfeld Color Company, Washington, Pa., that glaze consisting essentially, in weight percent, of about 6.8% alumina hydrate #710B, 28.8% black pigment #2991, and 64.4% of a glass frit containing a high level of lead. Because the frit contains lead, any process for coating the domes is subject to state and federal regulations pertaining to the use of toxic materials in the course of production.

Accordingly, the primary objective of the present invention was to develop a glaze demonstrating characteristics closely approximating those of the Drakenfeld glaze, but the frit component of which would be essentially lead-free. Among the critical properties which the frit composition must exhibit are: (1) a coefficient of thermal expansion (0°-300° C.) somewhat below that of the glass comprising the dome (a coefficient of thermal expansion of about $88 \times 10^{-7}/°C.$), such as to insure that the glaze coating is not placed under tension;

(2) a softening point below 500° C.;

(3) a maturing temperature no higher than 560° C., said maturing temperature comprising the point at which the glaze demonstrates sufficient flow in 15 minutes to produce an essentially defect-free coating;

(4) a matte or low gloss finish when fired;

(5) compatibility with the Drakenfeld #2991 black pigment and #710B alumina hydrate; and (6) good stability in the ambient environment; and (7) good resistance to abrasion.

The fired glaze must display a matte finish and an attenuation of infrared radiation at a wavelength of 1.06 microns of at least 55 dB. The black pigment and alumina hydrate provide the required attenuation and act to reduce gloss levels.

Because of the 1974 promulgation by the Federal Food and Drug Administration (FDA) in its *Compliance Guidance Manual* of maximum limits of lead metal release which a food-contacting surface must not exceed, considerable research has been undertaken to develop lead-free glazes for tableware and culinary ware exhibiting the decorative properties of the prior lead-containing glazes. U.S. Pat. Nos. 4,224,074, 4,282,035, 4,285,731, and 4,311,504 are illustrative of that research. Unfortunately, however, the maturing temperatures of those glazes have exceeded 650° C. and commonly have required temperatures in excess of 700° C. Such circumstance has rendered them impractical for the present application.

Hence, in essence, the goal of the present invention was to design an essentially lead-free glass frit which would exhibit the properties of and, accordingly, comprise a substitute for the lead-containing frit present in Drakenfeld #24-1255 glaze. In general, the coefficient of thermal expansion of the glazes (0°-300° C.) will not be less than about $80 \times 10^{-7}/°C.$

SUMMARY OF THE INVENTION

I have found that goal can be achieved in glass frits having compositions, expressed on the oxide basis, within the base $Bi_2O_3$ and/or $V_2O_5$-$ZnO$-$B_2O_3$-$P_2O_5$ system, but also containing vital small amounts of $Li_2O$, $Al_2O_3$, and $ZrO_2$ and an alkali metal oxide selected from the group consisting of $Na_2O$ and/or $K_2O$ and/or an alkaline earth metal oxide selected from the group consisting of CaO, SrO, and BaO. The identity of the components and the concentrations of each must be strictly controlled in order to not only yield a low temperature melting frit, but also to provide a glaze exhibiting the complex matrix of properties discussed above. For example, in terms of weight percent, the frit compositions require 1-4% $Li_2O$, 2-5% $Al_2O_3$, 2-6% $ZrO_2$, 20-30% ZnO, 32-42% $B_2O_3$, and 6-10% $P_2O_5$. The operable content of $Bi_2O_3$ and/or $V_2O_5$ is dependent upon the accompanying level of alkali metal oxide and/or alkaline earth metal oxide. To illustrate, a minimum of 5% $Bi_2O_3$ and/or $V_2O_5$ will yield a satisfactory frit when at least 2% $Na_2O$ or 5% $K_2O$ is included in the composition. In contrast, in the absence of $Na_2O$ and/or $K_2O$, but with at least 3% CaO or 6% SrO or 9% BaO present, a minimum of 9% $Bi_2O_3$ and/or $V_2O_5$ is demanded. $Bi_2O_3$ may be employed in amounts up to 16% and $V_2O_5$ in amounts up to 22%, the combination of $Bi_2O_3 + V_2O_5$ not exceeding 25%. In summary, compositions effective in producing the desired frits consist essentially, expressed in terms of weight percent on the oxide basis, of

| | | | |
|---|---|---|---|
| $Li_2O$ | 1-4 | $Na_2O + K_2O$ | 0-12 |
| ZnO | 20-30 | CaO | 0-7 |
| $B_2O_3$ | 32-42 | SrO | 0-10 |
| $Al_2O_3$ | 2-5 | BaO | 0-15 |
| $ZrO_2$ | 2-6 | CaO + SrO + BaO | 0-15 |
| $P_2O_5$ | 6-10 | $V_2O_5$ | 0-22 |
| $Na_2O$ | 0-8 | $Bi_2O_3$ | 0-16 |
| $K_2O$ | 0-8.40 | $V_2O_5 + Bi_2O_3$ | 5-25 | wherein a minimum of 5% $V_2O_5$ and/or $Bi_2O_3$ is operable in the presence of at least 2% $Na_2O$ or 5% $K_2O$, and a minimum of 9% $V_2O_5$ and/or $Bi_2O_3$ is operable in the essential absence of $Na_2O$ or $K_2O$, but in the presence of at least 3% CaO or 6% SrO or 9% BaO. The preferred compositions contain about 10-15% $V_2O_5$ and/or $Bi_2O_3$ As employed herein, the expression "essentially lead-free" means that no substantial amount of lead or lead-containing compound is intentionally incorporated into the composition.

Prior Art

U.S. Pat. No. 3,258,434 discloses the preparation of semiconducting glasses consisting essentially of $B_2O_3$ with 20-40 mole percent of a glass network modifier selected from the group consisting of MgO, CaO, SrO, and BaO and at least 15 mole percent of a multivalent metal oxide selected from the group consisting of $Cr_2O_3$, $Fe_2O_3$, $As_2O_3$, $V_2O_5$, $TiO_2$, NiO, CoO, $MnO_2$, $MoO_3$, $WO_3$, and $As_2O_3$. Whereas the patent describes $V_2O_5$-containing glasses, there is no reference to low temperature melting glazes having compositions within the base $ZnO$-$B_2O_3$-$P_2O_5$ system. The glasses are also noted as having use temperatures to 600° C.; obviously much more refractory glasses than the compositions of the present invention.

U.S. Pat. No. 3,446,695 claims solder glasses consisting essentially, in weight percent, of 5–30% $V_2O_5$, 20–40% $B_2O_3$, 40–60% ZnO, and 1–10% CuO having softening points between 525°–575° C. and coefficients of thermal expansion (0°–300° C.) of $40-50\times10^{-7}/°C$. Such compositions are illustrative of relatively low temperature melting glasses, but, being outside of the ranges operable in the present invention, do not demonstrate the other properties desired in the glasses of the present invention.

U.S. Pat. No. 3,650,778 is concerned with low temperature melting glasses, i.e., having softening points below 500° C., with coefficients of thermal expansion of $57-62\times10^{-7}/°C$. The glasses were free from $Na_2O$ and the compositions claimed consisted essentially, in weight percent, of 10–60% ZnO, 13–60% $V_2O_5$, 7.5–13% $B_2O_3$, and 10–25% $P_2O_5$. Although not claimed, the patent presents working examples containing $Bi_2O_3$. Nevertheless, the $B_2O_3$ content is far less than the minimum demanded in the frits of the present invention. Moreover, the expansions of the patented glasses are too low to be operable in the application for which the present inventive glazes were desired.

DESCRIPTION OF PREFERRED EMBODIMENTS

Table I records a group of glass frit compositions, expressed in parts by weight on the oxide basis, illustrating the instant invention. Because the sum of the individual constituents equals or closely approximates 100, for all practical purposes the various components may be deemed to be present in weight percent. The actual batch ingredients employed may be any materials, either the oxide or other compound, which, when melted together with the combination of the remaining components, will be converted into the desired oxide in the proper proportions. To illustrate, soda ash can comprise the source of $Na_2O$ and $BaCO_3$ the source of BaO.

Batches for the exemplary compositions were compounded in the indicated proportions, ballmilled to assist in securing a homogeneous melt, and charged into platinum crucibles. The crucibles were introduced into a furnace operating at about 1000° C., the batches melted for about one hour, the melts quenched into glass ribbon by drawing through steel rollers, and the ribbon ballmilled to an average particle size of about 7–8 microns. Glass slabs were poured from Examples 1 and 2 and bars cut therefrom suitable for measuring physical properties thereon in accordance with conventional glass analysis practice The softening point (S.P.), annealing point (A.P.), and Strain Point (St.P.) are reported in terms of °C., the coefficient of thermal expansion (Exp.) in terms of $\times 10^{-7}/°C$., and the density (Den.) in terms of $g/cm^3$.

It will be appreciated that the above description reflects laboratory melting and forming practice only. The following exemplary glasses can be melted and formed utilizing processes and techniques conventional in large scale, commercial glassmaking.

TABLE I

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| $Na_2O$ | 4.94 | 5.33 | — | — | — | — | 2.83 | 2.74 | — | 5.64 | — | — | — | — | — | 5.28 | — | — |
| CaO | — | — | 4.79 | 5.07 | — | — | | | | | | | | | | | | |
| $K_2O$ | | | | | | | — | — | — | — | 7.34 | 7.92 | 8.40 | 3.83 | 7.77 | — | 8.15 | 7.77 |
| BaO | — | — | — | — | 12.27 | 13.04 | — | 6.73 | 6.74 | — | — | — | — | 6.27 | — | — | — | — |
| $V_2O_5$ | 20.09 | 12.77 | 12.82 | 5.9 | 11.96 | 5.53 | 5.89 | 5.7 | 5.72 | 5.88 | 5.03 | 12.48 | 5.75 | 12.22 | 11.76 | — | — | 5.11 |
| $Bi_2O_3$ | | | | | | | | | | | | | — | — | — | 13.75 | 13.4 | 12.78 |
| $Li_2O$ | 2.37 | 2.55 | 2.56 | 2.71 | 2.39 | 2.54 | 2.71 | 2.62 | 2.63 | 2.70 | 2.31 | 2.50 | 2.65 | 2.44 | 2.35 | 2.53 | 2.47 | 2.35 |
| ZnO | 22.66 | 24.42 | 24.53 | 25.96 | 22.88 | 24.31 | 25.92 | 25.08 | 25.15 | 25.85 | 22.11 | 23.87 | 25.30 | 23.39 | 22.51 | 24.2 | 23.58 | 27.48 |
| $B_2O_3$ | 35.12 | 37.85 | 38.02 | 40.24 | 35.46 | 37.68 | 40.17 | 38.87 | 38.98 | 40.07 | 34.27 | 37.00 | 39.22 | 36.25 | 34.88 | 37.51 | 36.56 | 34.85 |
| $P_2O_5$ | 7.52 | 8.10 | 8.14 | 8.61 | 7.59 | 8.07 | 8.60 | 8.32 | 8.34 | 8.58 | 7.34 | 7.92 | 8.40 | 7.76 | 7.47 | 8.03 | 7.83 | 7.46 |
| $Al_2O_3$ | 3.50 | 3.77 | 3.79 | 4.01 | 3.54 | 3.76 | 4.01 | 3.88 | 3.89 | 4.00 | 3.42 | 3.69 | 3.91 | 3.61 | 3.48 | 3.74 | 3.64 | 3.47 |
| $ZrO_2$ | 3.71 | 4.00 | 4.01 | 4.25 | 3.74 | 3.98 | 4.24 | 4.10 | 4.11 | 4.23 | 3.62 | 3.91 | 4.14 | 3.83 | 3.68 | 3.96 | 3.86 | 3.68 |
| S.P. | 448 | 485 | | | | | | | | | | | | | | | | |
| A.P. | 346 | 386 | | | | | | | | | | | | | | | | |
| St.P. | 330 | 342 | | | | | | | | | | | | | | | | |
| Exp. | 83.5 | 82.2 | | | | | | | | | | | | | | | | |
| Den. | 2.646 | 2.659 | | | | | | | | | | | | | | | | |

The powdered samples were hand pressed into a cylindrical shape having a height of about 0.5" and a diameter of about 0.5". Each cylinder was placed onto a platinum foil having a thickness of about 0.025" and the foil introduced into an electrically-fired furnace operating at a desired temperature, the specimens maintained at that temperature for about 15 minutes, and thereafter withdrawn from the furnace to cool to room temperature in the ambient environment. The firing of the cylindrical mass causes the frit to fuse and flow into the shape of a button, the diameter of which provides a practical indication of viscous flow. Also, the buttons can be observed visually to determine the extent of gloss.

Table II reports the results of test firing the various cylindrical masses at several temperatures. As reported there, SM indicates the mass was sintered and exhibited a matte surface; SG indicates the mass was sintered and exhibited a glossy surface; RE indicates the mass exhibited rounded edges; i.e., the mass was subject to incipient flow; and F indicates the mass actually fused and flowed. Flow is undesirable in the present application.

TABLE II

| Example | 500° C. | 525° C. | 550° C. | 575° C. | 600° C. | 650° C. |
|---|---|---|---|---|---|---|
| 1 | SG | RE | F | — | — | — |
| 2 | SM | SG | RE | F | — | — |
| 3 | — | — | SM | SG | RE | F |
| 4 | — | — | — | SM | SG | F |
| 5 | — | — | SM | SG | RE | F |
| 6 | — | — | — | SM | SG | F |
| 7 | — | — | SM | SG | RE | F |
| 8 | — | — | SM | SG | RE | F |
| 9 | — | — | — | SM | SG | F |
| 10 | — | SM | SG | RE | F | — |
| 11 | SG | RE | F | F | — | — |
| 12 | — | SM | SG | RE | F | — |
| 13 | SM | SG | RE | F | — | — |
| 14 | SG | RE | F | — | — | — |
| 15 | — | SM | SG | RE | F | — |
| 16 | — | SM | SG | RE | F | — |
| 17 | — | SM | SG | RE | F | — |

TABLE II-continued

| Example | 500° C. | 525° C. | 550° C. | 575° C. | 600° C. | 650° C. |
|---------|---------|---------|---------|---------|---------|---------|
| 18 | — | SG | RE | F | — | — |

As can be observed, each of the frits except Examples 4, 6, and 9 sintered below 560° C.; the latter three were too refractory, not sintering until a temperature of 575° was reached. A review of Table I points out those compositions contained no $Na_2O$ or $K_2O$ and a low $V_2O_5$ level.

Table III records visual descriptions of glazes produced from several of the inventive frits which were hand mixed with Drakenfeld #324 screening oil, applied to glass microscope slides by silk screening, doctor blading, or spraying, and fired at various temperatures for various times. Where spraying was used, the pastes were dissolved in isopropanol. The thicknesses of the coatings ranged about 0.002–0.003" ($\approx$50–75 microns).

TABLE III

| | Firing Schedule | | | | |
|---|---|---|---|---|---|
| Example | 490°–500° C. 8 mins. | 525°–530° C. 15 mins. | 540°–550° C. $\approx$15 mins. | 560° C. 20 mins. | 600° C. 10 mins. |
| 1 | Glossy | Transparent | — | — | — |
| 2 | Matte | Glossy | — | — | — |
| 3 | — | — | Matte | Some Gloss | — |
| 5 | — | — | Matte | Some Gloss | — |
| 7 | — | — | Matte | Some Gloss | — |
| 8 | — | — | Matte | Some Gloss | — |
| 10 | — | Matte | Some Gloss | Glossy | Foamed |
| 11 | Glossy | Foamed | — | — | — |
| 12 | — | Matte | Glossy | Glossy | Foamed |
| 13 | — | Matte | Glossy | Glossy | Glossy |
| 14 | Matte | Some Gloss | Glossy | — | Foamed |
| 15 | Matte | Some Gloss | Glossy | — | Melted |
| 16 | Matte | Some Gloss | Glossy | — | Melted |
| 17 | — | Matte | Some Gloss | — | Melted |
| 18 | — | Matte | Some Gloss | — | Melted |

As can be observed, the inventive frits were compatible with the commercial screening oil; gloss can be controlled through both frit composition and firing temperature. Each sample exhibited excellent adhesion to the glass slide.

Table IV provides visual descriptions of glazes produced from a number of the inventive frits which were mixed in combination also with Drakenfeld black pigment #2991 (Black) and some with Drakenfeld alumina hydrate #710B (Hydrate) in Drakenfeld #324 screening oil, applied to glass microscope slides by silk screening, doctor blading, or diluted with isopropanol for spraying, and fired at temperatures between 480°–545° C. for 15 minutes. Again, the thickness of the coatings ranged about 0.002"–0.003".

TABLE IV

| Ex. | Additive Weight % | How Applied | 480° C. | 500° C. | 525° C. | 540° C. | 550° C. |
|---|---|---|---|---|---|---|---|
| 1 | 28.8 Black 6.8 Hydrate | Spray | Soft Gloss | Glossy | Glossy | Too Glossy | Too Glossy |
| 2 | 28.8 Black 6.8 Hydrate | Spray | — | Matte | Soft Gloss | Glossy | Glossy |
| 2 | 39.5 Black 6.8 Hydrate | Screen | — | — | Matte | Matte | Soft Gloss |
| 2 | 35.6 Black | Spray | — | Matte | Some Gloss | Soft Gloss | Soft Gloss |
| 11 | 40 Black | Doctor Blade | — | — | Matte | Some Gloss | Glossy |
| 16 | 40 Black | Doctor Blade | — | — | Matte | Matte | Some Gloss |
| 17 | 40 Black | Doctor Blade | — | — | Matte | Matte | Some Gloss |
| 17 | 35.6 Black | Spray | — | — | Matte | Matte | Matte |

Example 17 is the most preferred embodiment of the inventive compositions.

I claim:

1. An essentially lead-free glass composition consisting essentially, expressed in terms of weight percent on the oxide basis, of

| | | | |
|---|---|---|---|
| $Li_2O$ | 1–4 | $Na_2O + K_2O$ | 0–12 |
| ZnO | 20–30 | CaO | 0–7 |
| $B_2O_3$ | 32–42 | SrO | 0–10 |
| $Al_2O_3$ | 2–5 | BaO | 0–15 |
| $ZrO_2$ | 2–6 | $CaO + SrO + BaO$ | 0–15 |
| $P_2O_5$ | 6–10 | $V_2O_5$ | 0–22 |
| $Na_2O$ | 0–8 | $Bi_2O_3$ | 0–16 |
| $K_2O$ | 0–8.40 | $V_2O_5 + Bi_2O_3$ | 5–25 | wherein a minimum of 5% $V_2O_5+Bi_2O_3$ is required in the presence of at least 2% $Na_2O$ or 5% $K_2O$, and a minimum of 9% $V_2O_5$ and/or $Bi_2O_3$ is required in the essential absence of $Na_2O$ or $K_2O$, but in the presence of at least 3% CaO or 6% SrO or 9% BaO, said glass exhibiting a softening point below 500° C., a maturing temperature no higher than 560° C., and a coefficient of thermal expansion (0°–300° C.) below about $88 \times 10^{-7}$/°C. but not less than about $80 \times 10^{-7}$/°C.

2. A glass according to claim 1 wherein said $V_2O_5$ and/or $Bi_2O_3$ is present in an amount of about 10–15%.

3. A glass according to claim 1 having the following approximate composition:

| | | | |
|---|---|---|---|
| $Li_2O$ | 2.47 | $ZrO_2$ | 3.86 |
| ZnO | 23.58 | $P_2O_5$ | 7.83 |
| $B_2O_3$ | 36.56 | $K_2O$ | 8.15 |
| $Al_2O_3$ | 3.64 | $Bi_2O_3$ | 13.4 |

* * * * *